(12) United States Patent
Ferris

(10) Patent No.: US 8,849,971 B2
(45) Date of Patent: Sep. 30, 2014

(54) LOAD BALANCING IN CLOUD-BASED NETWORKS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 510 days.

(21) Appl. No.: 12/127,926

(22) Filed: May 28, 2008

(65) Prior Publication Data

US 2009/0300210 A1    Dec. 3, 2009

(51) Int. Cl.
*G06F 15/173* (2006.01)
*G06F 9/50* (2006.01)

(52) U.S. Cl.
CPC .................................... *G06F 9/5077* (2013.01)
USPC ........... 709/223; 709/216; 709/217; 709/203; 709/224; 709/226; 718/1; 718/105; 718/104

(58) Field of Classification Search
USPC ........................................................ 709/226
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0051021 A1* | 3/2003 | Hirschfeld et al. | 709/223 |
| 2003/0105810 A1* | 6/2003 | McCrory et al. | 709/203 |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1* | 12/2005 | Nguyen et al. | 718/1 |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |

(Continued)

OTHER PUBLICATIONS

"rBuilder and the rPath Appliance Platform", 2007 rPath, Inc., www.rpath.com, 3 pages.

(Continued)

*Primary Examiner* — Hamza Algibhah
*Assistant Examiner* — Natisha Cox
(74) *Attorney, Agent, or Firm* — Lowenstein Sandler LLP

(57) ABSTRACT

A cloud management system can be configured to monitor and allocate resources of a cloud computing environment. The cloud management system can be configured to receive a request to instantiate a virtual machine. In order to instantiate the virtual machine, the cloud management system can be configured to determine the current resource usage and available resources of the cloud in order to allocate resources to the requested virtual machine. The cloud management system can be configured to scale the resources of the cloud in the event that resources are not available for a requested virtual machine.

17 Claims, 5 Drawing Sheets

(56) References Cited

U.S. PATENT DOCUMENTS

| | | | |
|---|---|---|---|
| 2007/0011291 A1 | 1/2007 | Mi et al. | |
| 2007/0028001 A1 | 2/2007 | Phillips et al. | |
| 2007/0226715 A1* | 9/2007 | Kimura et al. | 717/148 |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1* | 5/2008 | Hyser et al. | 718/105 |
| 2008/0172673 A1* | 7/2008 | Naik | 718/104 |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0055507 A1* | 2/2009 | Oeda | 709/216 |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210257 A1* | 8/2009 | Chalfant et al. | 705/4 |
| 2009/0210527 A1* | 8/2009 | Kawato | 709/224 |
| 2009/0210875 A1* | 8/2009 | Bolles et al. | 718/1 |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1* | 10/2009 | Goodman et al. | 718/1 |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0299366 A1 | 11/2010 | Stienhans et al. | |
| 2011/0016214 A1 | 1/2011 | Jackson | |
| 2011/0131335 A1 | 6/2011 | Spaltro et al. | |

OTHER PUBLICATIONS

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

(56) References Cited

OTHER PUBLICATIONS

Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

\* cited by examiner

LOAD BALANCING IN CLOUD-BASED NETWORKS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

To instantiate the virtual machine, the resources of the cloud must be allocated to support the virtual machine. Currently, the cloud architecture lacks the capability to allocate the resources properly and efficiently in order to maximize the usage of the resources. Also, the cloud architecture lacks the ability to scale the resources in the event the cloud lacks the necessary resources to support the virtual machine. Thus, there is a need in the art for methods and systems that provide load balancing and scaling in a cloud computing environment.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
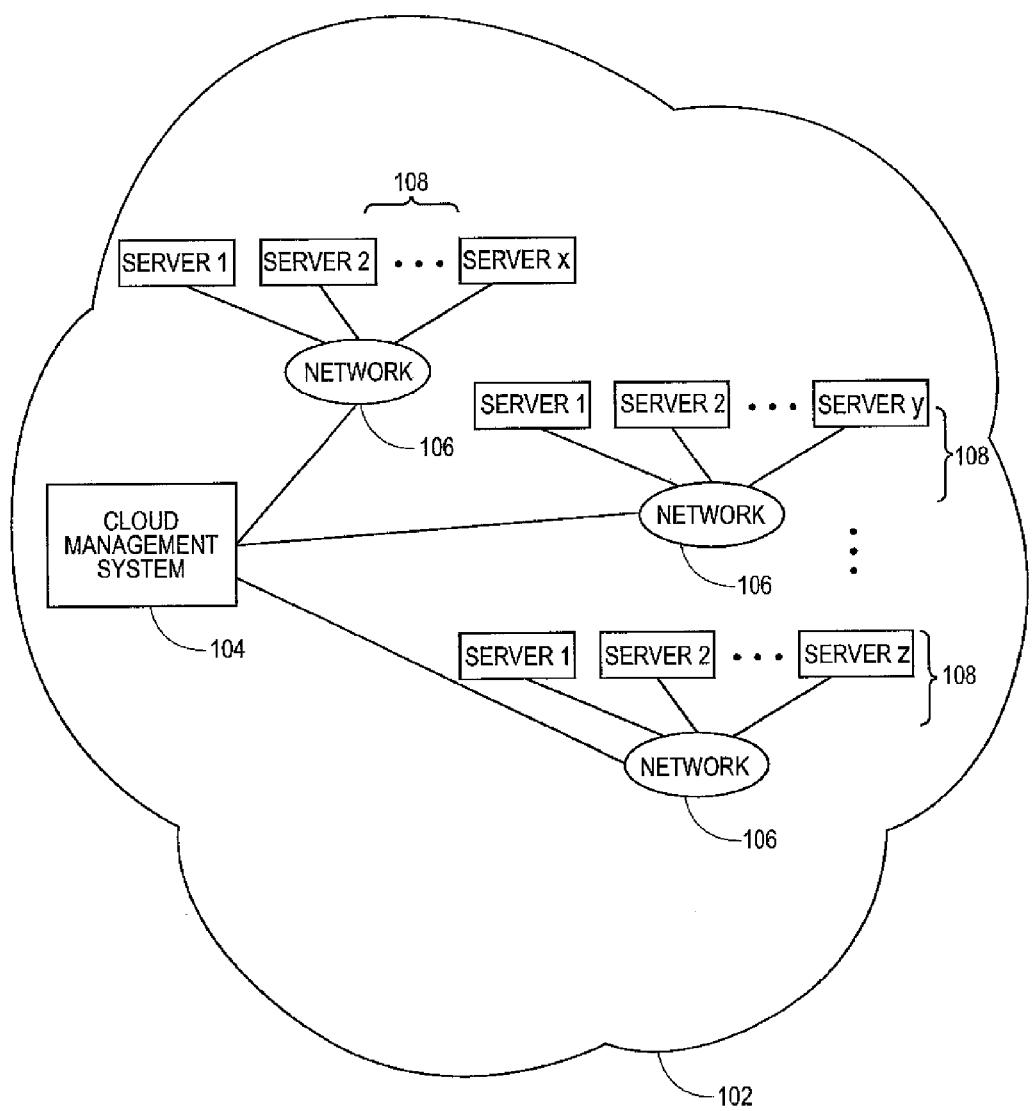
FIG. 1 illustrates an overall cloud system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes can be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for managing the resources in a cloud computing environment. More particularly, embodiments relate to platforms and techniques in which a cloud management system can enable load-balancing and scaling in order to maximize the cloud's resources.

According to embodiments, in general, a cloud management system can be configured to monitor and allocate resources of a cloud computing environment. A cloud computing environment can include a set of resource servers configured to deliver processor cycles, operating systems or components thereof, applications, input/output bandwidth, or other computing resources.

According to embodiments, to monitor and allocate the resources, the cloud management system can be configured to maintain a resource record. The resource record can include information such as overall computing resources of the cloud (processor cycles, bandwidth, memory, storage), computing resources of individual servers, overall available computing resources, available resources for individual servers, and virtual machines instantiated in the cloud. The cloud management system can also be configured to maintain resource records for external cloud computing environments.

According to embodiments, the cloud management system can be configured to receive a request to instantiate a virtual machine. In order to instantiate the virtual machine, the cloud management system can be configured to determine the current resource usage and available resources of the cloud in order to allocate resources to the requested virtual machine. The cloud management system can be configured to determine the current resource usage and available resources by examining the resource record.

According to embodiments, the cloud management system can be configured to allocate the available resources based on several factors in order to maximize resource usage in the cloud. The factors can include utilizing resources currently available, utilizing resources in the servers with high available resources, evenly distributing resource usage across the servers, and instantiating virtual machines in the server containing resources best suited to support the virtual machine. Additionally, the cloud management system can be configured to relocate current usage to accommodate a requested virtual machine to maximize resource usage.

According to embodiments, the cloud management system can be configured to scale the resources of the cloud in the event that resources are not available for a requested virtual machine. To scale the cloud, the cloud management system can be configured to communicate with reserve resource servers. The reserve resource servers can be maintained as inactivated until needed in the cloud. Once the cloud management system determines that additional resources are need, the cloud management system can be configured to activate the reserve resource servers and add their resources to the pool of available resources.

Additionally, according to embodiments, if the cloud lacks necessary resources to support a requested virtual machine, the cloud management system can be configured to determine the available resources of external clouds. If external clouds are available, the cloud management system can request instantiation of the virtual machine in the external clouds.

By performing load balancing and scaling, the cloud management system can efficiently allocate the resources of the cloud at the time of virtual machine requests. As such, the cloud can provide a consistent and stable computing environment without interrupts due to resource shortages.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
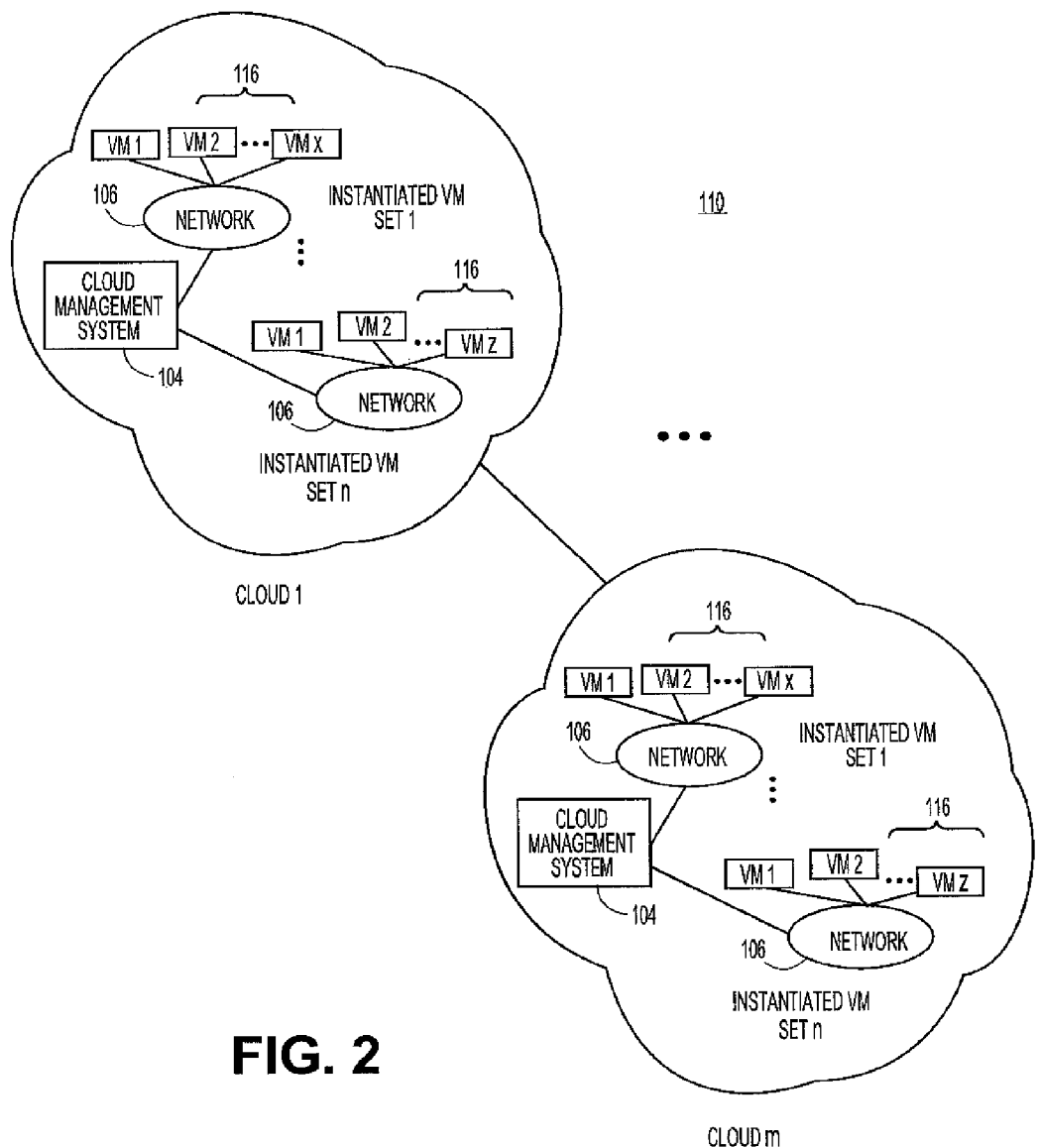
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
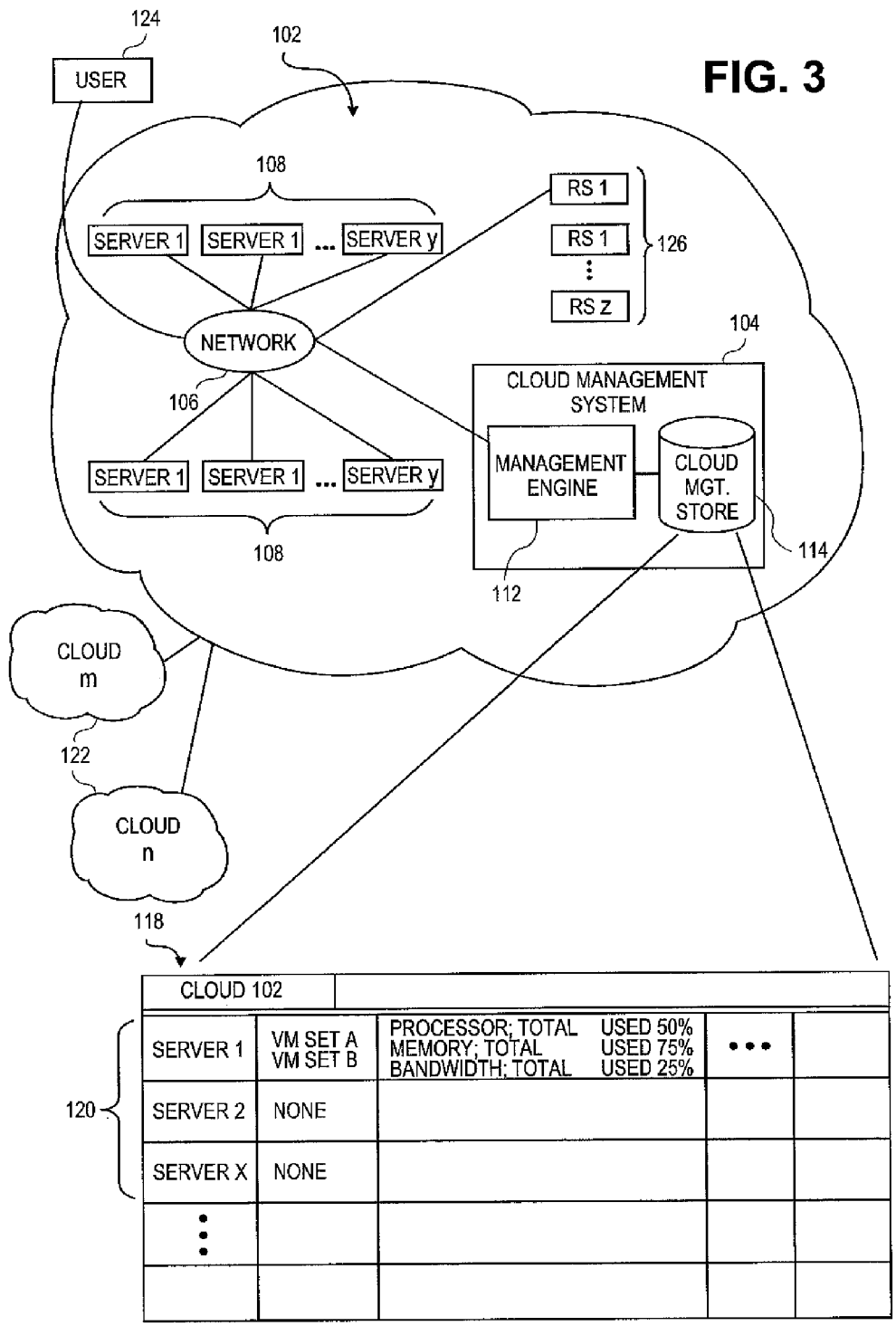
FIG. 3 illustrates a network configuration in which a cloud management system can provide load balancing and scaling, according to various embodiments.

FIG. 3 illustrates aspects of a cloud management system 104 and its management of cloud 102, according to various embodiments. In embodiments as shown, the cloud management system 104 can comprise a management engine 112 containing control logic for performing the processes of cloud management and a cloud management store 114. In embodiments as shown, the cloud management system 104 can be configured to build and communicate with sets of resource servers 108 via one or more networks 106, such as the Internet or other public or private network. The sets of resource servers 108 can be configured to deliver processor cycles, operating systems or components thereof applications, input/output bandwidth, or other computing resources.

In embodiments, the cloud management system 104 can be configured to monitor and allocate the resources of the sets of resource servers 108. To monitor and allocate the resources, the management engine 112 can be configured to maintain a resource record 118 in cloud management store 114. The resource record can include fields 120 for storing information such as overall computing resources of the cloud (processor cycles, bandwidth, memory, storage), computing resources of individual servers, overall available computing resources, available resources for individual servers, and virtual machines instantiated in the cloud.

In embodiments, the cloud management system 104 can also be configured to communicate with external clouds 122 and maintain resource records for external clouds 122 in cloud management store 114. For example, the management engine 112 can request a record for the resources of external clouds 122 from the cloud management systems of the external clouds 122. Likewise, the management engine 112 can be configured to communicate directly with the resource servers of external cloud 122.

In embodiments, the cloud management system 104 can be configured to receive a request to instantiate a virtual machine from a user 124. The management engine 112 can be configured to communicate with the user 124 via an interface over network 106. The interface can be any type of interface to allow the user to communicate information to the cloud management system 104. For example, the interface can be a specific graphical, command-line, or other interface generated by a program or application designed to communicate with the cloud management system 104. Likewise, the interface can be au interface generated in conventional formats, such as .html, capable of being executed in network programs and applications, such as a web browser.

In embodiments, to instantiate the virtual machine, the cloud management system 104 can be configured to determine the current resource usage and available resources of the cloud 102 in order to allocate resources to the requested virtual machine. In particular, the management engine 112 can be configured to retrieve the resource record 118 from cloud management store 114 and to determine the current resource usage and available resources by examining the resource record 118.

In embodiments, once resources are determined, the cloud management system 104 can be configured to allocate the available resources based on several factors in order to maximize resource usage in the cloud 102. The management engine can include algorithms to select the sets of resource servers 108 based on such factors as utilizing resources currently available, utilizing resources in the servers with high available resources, evenly distributing resource usage across the servers, and instantiating virtual machines in the server containing resources best suited to support the virtual machine. Additionally, the cloud management system 104 can be configured to relocate current usage to accommodate a requested virtual machine to maximize resource usage.

In embodiments, the cloud management system 104 can be configured to scale the resources of the cloud 102 in the event that resources are not available for a requested virtual machine. To scale the cloud 102, the management engine can be configured to communicate with reserve resource servers 126. The reserve resource servers 126 can be maintained inactive until needed in the cloud 102. In particular, once the cloud management system 104 determines that additional resources are need (e.g. new virtual machine requested), the management engine 112 can be configured to activate one or more of the reserve resource servers 126 and add their resources to the pool of available resources. The management engine 112 can add a new entry in resource record 118 to reflect the activation of a reserve resource server 126.

In embodiments, if the cloud 102 lacks necessary resources to support a requested virtual machine, the cloud management system 104 can be configured to determine the available resources of external clouds 122. For example, the management engine 112 can determine if a resource record 112 exists for an external cloud 122 in cloud management store 114. The management engine 112 can determine whether available resources exist by examining the resource record 112. If external clouds 122 are available, the cloud management system 104 can request instantiation of the virtual machine in the external clouds 122.

Figure 4:
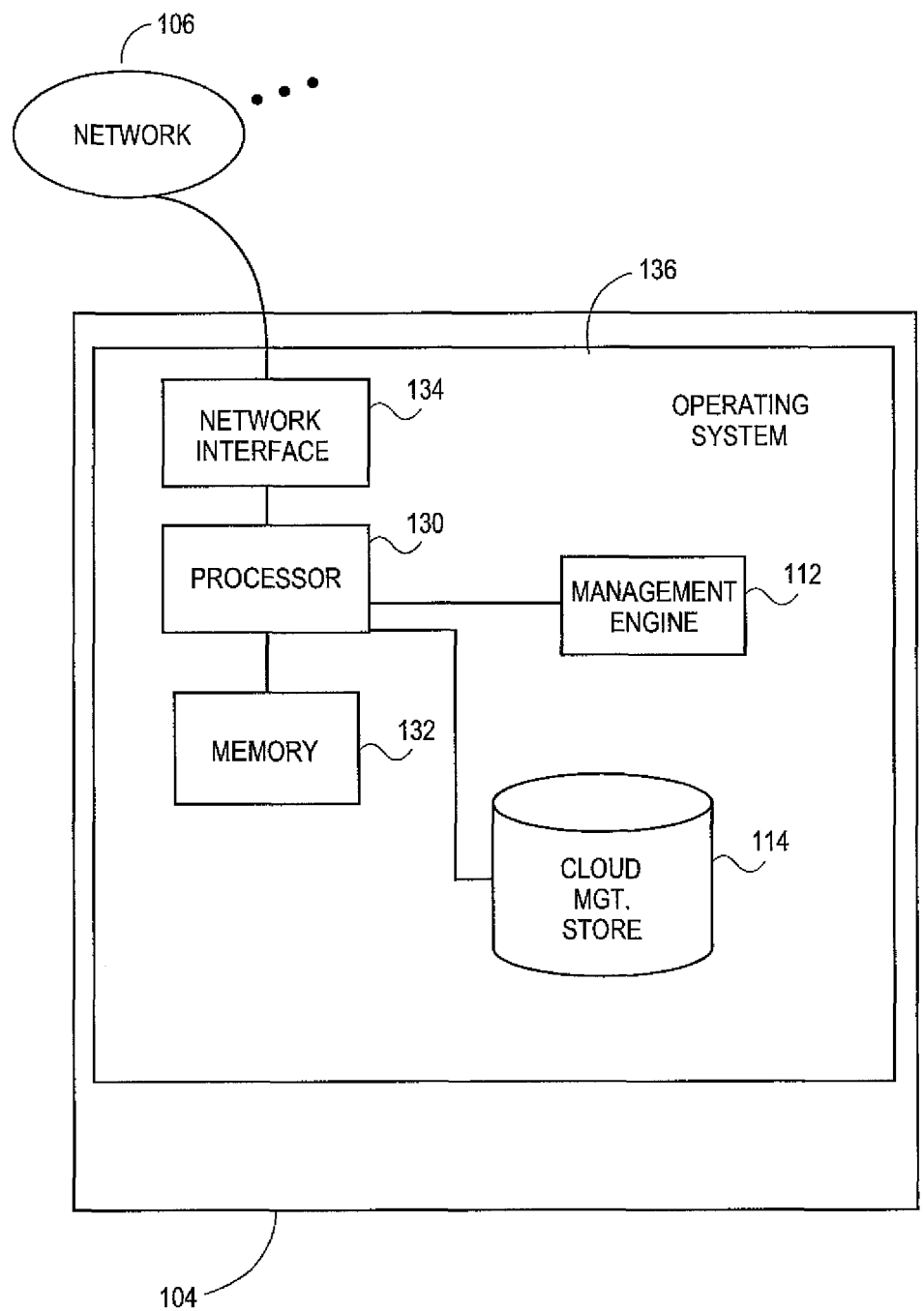
FIG. 4 illustrates an exemplary hardware configuration for a cloud management system, according to various embodiments.

FIG. 4 illustrates an exemplary diagram of hardware and other resources that can be incorporated in a cloud management system 104 configured to manage the cloud 102 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud management store 114, such as a database stored on a local hard drive. Processor 130 further communicates with network interface 134, such as an Ethernet or wireless data connection, which in turn communicates with one or more networks 106, such as the Internet or other public or private networks. Processor 138 also communicates with cloud management store 114 and management engine 112, to execute control logic to monitor and allocate the resources in cloud 102. Other configurations of cloud management system 104, associated network connections, and other hardware and software resources are possible.

Figure 5:
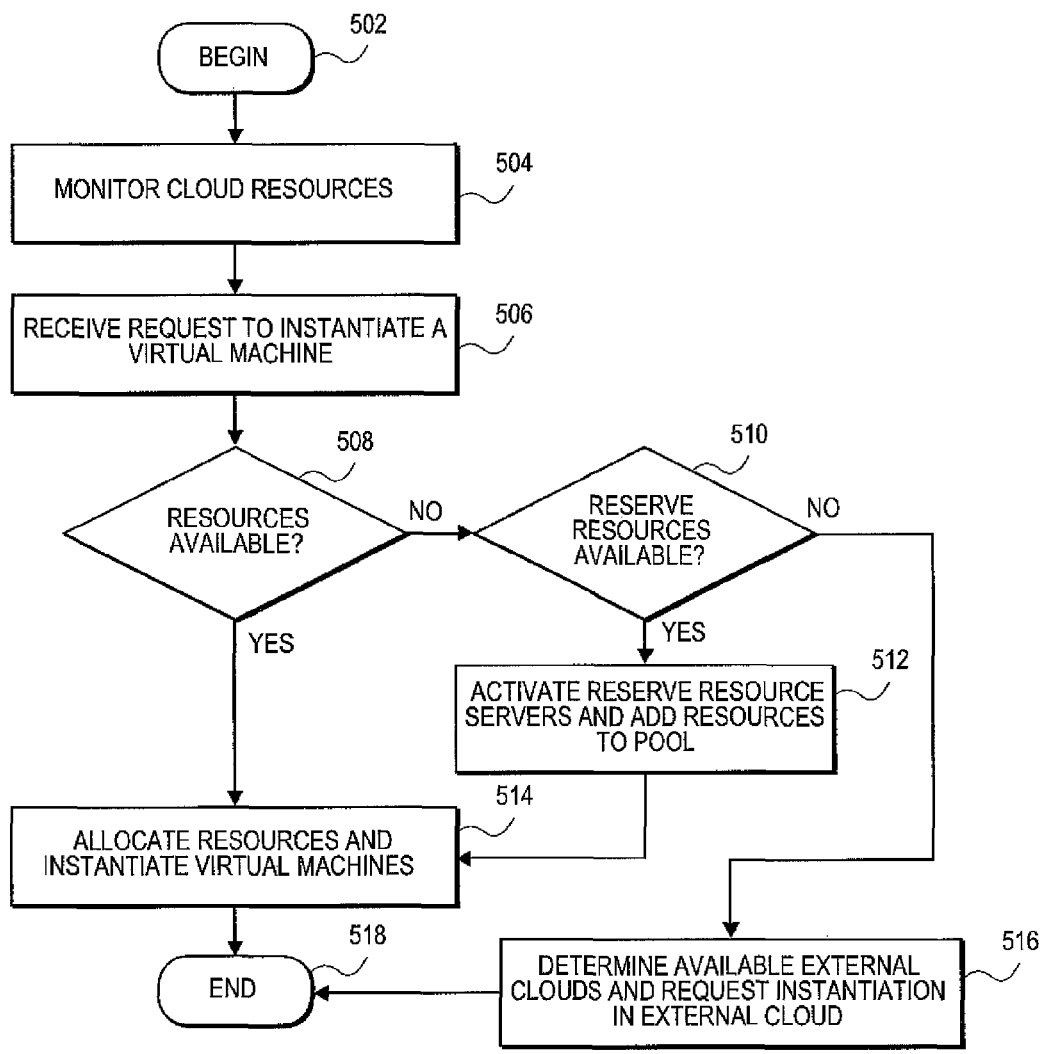
FIG. 5 illustrates a flowchart for overall load balancing and scaling, according to various embodiments.

FIG. 5 illustrates a flow diagram of overall resource monitoring and allocation in a cloud computing environment, according to embodiments of the present teachings. In 502, processing can begin. In 504, the cloud management system 104 can monitor the resources of cloud 102. The cloud management system 104 can maintain a resource record. The resource record can include information such as overall computing resources of the cloud (processor cycles, bandwidth, memory, storage), computing resources of individual servers, overall available computing resources, available resources for individual servers, and virtual machines instantiated in the cloud. The cloud management system 104 can also maintain resource records for external cloud computing environments.

In 506, the cloud management system 104 can receive a request from a customer, administrator, or other user to instantiate virtual machines or other resources in cloud 102. In 508, the cloud management system 104 can determine if the cloud 102 has the available resources to support the virtual machines. In order to instantiate the virtual machine, the cloud management system 104 can determine the current resource usage and available resources of the cloud in order to allocate resources to the requested virtual machine. The cloud management system 104 can determine the current resource usage and available resources by examining the resource record.

If resources are not available, in 510, the cloud management system 104 can determine if reserve resources are available. If available, in 512, the cloud management system 104 can scale the cloud 102 by activating the reserve resource servers and add the resources to the pool of available resources. The cloud management system 104 can add the reserve resources to the resource record. Then, in 514, the cloud management system 104 can allocate the resources and instantiate the virtual machines. The cloud management system 104 can allocate the available resources based on several factors in order to maximize resource usage in the cloud. The factors can include utilizing resources currently available, utilizing resources in the servers with high available resources, evenly distributing resource usage across the servers, and instantiating virtual machines in the server containing resources best suited to support the virtual machine. Additionally, the cloud management system 104 can relocate current usage to accommodate a requested virtual machine to maximize resource usage.

If the cloud lacks necessary resources to support a requested virtual machine, in 516, the cloud management system 104 can be configured to determine the available resources of external clouds. If external clouds are available the cloud management system 104 can request instantiation of the virtual machines in the external clouds.

Then, in 518, if the cloud 102 processes terminate, the process can end, but the process can return to any point and repeat.

In the foregoing and other embodiments, the user making an instantiation request or otherwise accessing the cloud network can be a person, customer, subscriber, corporation, organization, or other entity. In embodiments, the user can be or include another virtual machine, application or process. In further embodiments, multiple users or entities can share the use of a set of virtual machines or other resources.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method, comprising:

allocating a set of computing resources in a cloud computing environment to a virtual machine in the cloud computing environment;

maintaining, by a processor, a record of computing resources in the cloud computing environment and in an additional cloud computing environment external to the cloud computing environment, wherein available computing resources in the cloud computing environment and the additional cloud computing environment are determinable from the record;

receiving a request to instantiate an additional virtual machine in the cloud computing environment;

determining, by the processor, in response to the request to instantiate the additional virtual machine, that the cloud computing environment lacks available computing resources to support the additional virtual machine based on the maintained record of computing resources;

determining, by the processor, in response to the determination that the cloud computing environment lacks available computing resources to support the additional virtual machine, that a set of inactive reserve resources cannot support the additional virtual machine;

determining, by the processor, in response to the determination that the inactive reserve resources of the cloud computing environment cannot support the additional virtual machine, that computing resources in the additional cloud external to the cloud computing environment are sufficient to support the additional virtual machine in view of the maintained record of computing resources and offers of availability from the computing resources in the additional cloud;

instantiating, by the processor, the additional virtual machine using computing resources provided by the additional cloud; and tracking, by the processor, selected computing resources from the additional cloud used to provide the additional virtual machine.

2. The method of claim 1, wherein the available computing resources comprise one of computing resources of individual servers providing the set of computing resources and computing resources of other individual servers.

3. The method of claim 1, wherein the computing resources in the cloud computing environment are allocated based on the available computing resources as determined from the record.

4. The method of claim 1, wherein the maintained record of computing resources comprises computing resources in the additional cloud.

5. A system, comprising:
a network interface to a virtual machine in a cloud computing environment; and
a processor coupled with memory to:
- allocate a set of computing resources in a cloud computing environment to a virtual machine in the cloud computing environment;
- maintain a record of computing resources in the cloud computing environment and in an additional cloud computing environment external to the cloud computing environment, wherein available computing resources in the cloud computing environment and the additional cloud computing environment are determinable from the record;
- receive a request to instantiate an additional virtual machine in the cloud computing environment;
- determine, in response to the request to instantiate the additional virtual machine, that the cloud computing environment lacks available computing resources to support the additional virtual machine based on the maintained record of computing resources;
- determine, in response to the determination that the cloud computing environment lacks available computing resources to support the additional virtual machine, that a set of inactive reserve resources cannot support the additional virtual machine;
- determine, in response to the determination that the inactive reserve resources of the cloud computing environment cannot support the additional virtual machine, that computing resources in the additional cloud external to the cloud computing environment are sufficient to support the additional virtual machine in view of the maintained record of computing resources and offers of availability from the computing resources in the additional cloud;
- instantiate the additional virtual machine using computing resources provided by the additional cloud; and
- track the selected computing resources from the additional cloud used to provide the additional virtual machine.

6. The system of claim 5, wherein the available computing resources comprise one of computing resources of individual servers providing the set of computing resources and computing resources of other individual servers.

7. The system of claim 5, wherein the computing resources in the cloud computing environment are allocated based on the available computing resources as determined from the record.

8. The system of claim 5, wherein the maintained record of computing resources comprises computing resources in the additional cloud.

9. A non-transitory computer-readable medium having control logic stored thereon that, when executed by a processor, causes the processor to perform operations comprising:
- allocating a set of computing resources in a cloud computing environment to a virtual machine in the cloud computing environment;
- maintaining, by the processor, a record of computing resources in the cloud computing environment and in an additional cloud computing environment external to the cloud computing environment, wherein available computing resources in the cloud computing environment and the additional cloud computing environment are determinable from the record;
- receiving a request to instantiate an additional virtual machine in the cloud computing environment;
- determining, by the processor, in response to the request to instantiate the additional virtual machine, that the cloud computing environment lacks available computing resources to support the additional virtual machine based on the maintained record of computing resources;
- determining, by the processor, in response to the determination that the cloud computing environment lacks available computing resources to support the additional virtual machine, that a set of inactive reserve resources cannot support the additional virtual machine;
- determining, by the processor, in response to the determination that the inactive reserve resources of the cloud computing environment cannot support the additional virtual machine, that computing resources in the additional cloud external to the cloud computing environment are sufficient to support the additional virtual machine in view of the maintained record of computing resources and offers of availability from the computing resources in the additional cloud;
- instantiating, by the processor, the additional virtual machine using computing resources provided by the additional cloud; and
- tracking, by the processor, selected computing resources from the additional cloud used to provide the additional virtual machine.

10. The non-transitory computer medium of claim 9, wherein the available computing resources comprise one of computing resources of individual servers providing the set of computing resources and computing resources of other individual servers.

11. The non-transitory computer medium of claim 9, wherein the computing resources in the cloud computing environment are allocated based on the available computing resources as determined from the record.

12. The non-transitory computer medium of claim 9, wherein the maintained record of computing resources comprises computing resources in the additional cloud.

13. The method of claim 1, wherein the instantiating further comprises identifying available computing resources of individual servers to satisfy a set of instantiation requirements of the additional virtual machine.

14. The method of claim 1, wherein the instantiating further comprises load balancing among individual servers contributing resources to the currently available computing resources.

15. The system of claim 5, wherein the instantiating further comprises load balancing among individual servers contributing resources to the currently available computing resources.

16. The non-transitory computer medium of claim 9, wherein the instantiating further comprises load balancing among individual servers contributing resources to the currently available computing resources.

17. The method of claim 1, further comprising:
- examining the maintained record of computing resources to determine whether the available resources in the cloud computing environment are sufficient to instantiate the additional virtual machine.

* * * * *